Patented Apr. 18, 1939

2,154,664

UNITED STATES PATENT OFFICE 2,154,664

COMPOSITION TO INCREASE THE EFFICIENCY OF INTERNAL COMBUSTION ENGINES

Firman L. Carswell and Rosenaldo F. Sanchez, Kansas City, Kans., assignors, by direct and mesne assignments, to M. W. Borders, Jr., Kansas City, Mo.

No Drawing. Application July 6, 1936, Serial No. 89,234

6 Claims. (Cl. 87—9)

This invention relates to a composition material for use in internal combustion engines for increasing the efficiency thereof.

The principal object of the present invention is the provision of a composition of matter which, when introduced into the cylinder of a reciprocating engine, will function to cause said engine to operate more efficiently.

Another object is the provision of an emulsion containing exfoliated vermiculite, which, when introduced into the cylinder of an internal combustion engine, will function to cause a more perfect fitting of the engine piston in the cylinder.

A further object is the production of a composition material which, when introduced into the cylinder of an internal combustion engine, will create a coating on the cylinder and piston walls to cause a smoothing of said walls by filling irregularities in the surfaces thereof as the engine is operated.

Other objects are the production of a composition of matter which will, when introduced into the cylinders of an internal combustion engine, lubricate the parts and prevent to a large degree the accumulation of carbon, and will also soften carbon deposits and cause them to break away from the metal parts and pass from the cylinder.

Further objects of this invention will be apparent from the following specification and claims.

It has been found that certain forms of mica, such as vermiculite, Jeffersite, zonolite, biolite, etc., when in finely divided exfoliated form, have valuable properties which make it suitable for use in composition for increasing the efficiency of internal combustion engines. While reference will be made to the mica as "vermiculite," it is to be understood other equivalent materials such as enumerated may also be used.

Vermiculite to be used in the present invention is expanded or exfoliated by heating, and then ground to finely divided, plate-like particles of exceedingly small dimension. In order to obtain the best results, the expanded vermiculite is ground in the presence of water. For best results, the vermiculite is ground to pass through a two hundred mesh screen, or finer.

The finely divided vermiculite is first treated with water and then a quantity of oil is added to form an emulsion. The ordinary hydrocarbon lubricating oil may be used; however, many other oils might be substituted therefor without destroying the value of the composition.

A very good mixture that has been found to give very good results is as follows: One pound of finely divided vermiculite, mixed with four pounds of water, and two pounds of oil to form an emulsion.

By first wetting the vermiculite with water, the fine, plate-like vermiculite particles are separated so that when the oil is added an emulsion will be produced.

A wide variation in the proportions of the elements entering into this composition may be used in the production of this product without departing from the general characteristics of the product. The fineness of the vermiculite and the grade of oil used will determine to a certain degree the proportions of the different ingredients to be used.

The functioning of this composition of matter when introduced into the cylinder of an internal combustion engine is not thoroughly understood; however, the following results, which increase the efficiency of the engine, are observed:

A coat or film of highly lubricating qualities is formed on the metal parts of the cylinder and piston; scars, pits, abrasions and irregularities in the metal parts are filled by the composition to produce smooth working surfaces; accumulated carbon is softened and caused to break away from the metal parts; furthermore, further accumulation of carbon on the metal parts is greatly reduced; and all parts of the engine associated with the cylinder chamber, including the valves, are beneficially effected by this composition.

Some of the results which are obtained by the use of this composition in internal combustion engines are:

Decreases oil pumping around the piston; increases compression; increases the mileage per gallon of gasoline; decreases amount of fumes and smoke from exhaust, and makes engine run smoother.

This vermiculite emulsion is suitable for use in new as well as old engines. It will clean out and smoothly surface the working parts of the old engine, and will maintain the new engine in an efficient running condition.

It is important that all the vermiculite used in this composition be thoroughly exfoliated to insure the finest possible division of the vermiculite particles and to prevent expansion after the composition has been inserted into the engine cylinder.

The vermiculite emulsion is preferably introduced into the combustion chamber of the engine through the spark plug opening and permitted to be positioned between the cylinder and piston and about the piston rings.

It is apparent that the present composition of matter not only serves as a lubricant, but also as filler for the undesirable irregularities of the surfaces of the working parts which are made smooth, thereby increasing the efficiency of the engine.

Having thus described the invention, what is claimed as new and desired to be secured by Letters Patent is:

1. A composition of matter to increase the efficiency of internal combustion engines, consisting of finely divided, exfoliated vermiculite intermixed with a sufficient quantity of oil and water to form an emulsion.

2. A composition of matter to increase the efficiency of internal combustion engines, consisting of finely divided, exfoliated vermiculite, a hydrocarbon oil and water.

3. A composition of matter to increase the efficiency of internal combustion engines, consisting of oil and water and a quantity of exfoliated vermiculite ground sufficiently fine to produce an emulsion when intermixed with said water and oil.

4. A composition of matter to increase the efficiency of internal combustion engines, consisting of exfoliated vermiculite reduced to pass through a two hundred mesh screen, with a sufficient amount of oil and water to form an emulsion.

5. A composition of matter to increase the efficiency of internal combustion engines, consisting of substantially one pound of finely divided, exfoliated vermiculite, four pounds of water and two pounds of oil.

6. A composition of matter to increase the efficiency of internal combustion engines, consisting of from one fourth to two pounds of finely divided exfoliated vermiculite that will pass through a two hundred mesh screen, from one to eight pounds of water, and a sufficient amount of oil to form an emulsion.

FIRMAN L. CARSWELL.
ROSENALDO F. SANCHEZ.